(12) United States Patent
Xu et al.

(10) Patent No.: US 10,078,348 B1
(45) Date of Patent: Sep. 18, 2018

(54) MOBILE DEVICE WITH SIZE-ADJUSTABLE SCREEN

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Cong Xu, Shenzhen (CN); Shun-Chuan Yang, New Taipei (TW); Yu-Chiao Huang, New Taipei (TW); Jun-Wei Yang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/640,761

(22) Filed: Jul. 3, 2017

(30) Foreign Application Priority Data

Jun. 16, 2017 (CN) .......................... 2017 1 0458849

(51) Int. Cl.
*G06F 1/00* (2006.01)
*G06F 1/16* (2006.01)
*H04M 1/02* (2006.01)

(52) U.S. Cl.
CPC .......... *G06F 1/1616* (2013.01); *G06F 1/1641* (2013.01); *H04M 1/0266* (2013.01)

(58) Field of Classification Search
CPC ... G06F 1/1616; G06F 1/1641; H04M 1/0266
See application file for complete search history.

(56) References Cited

U.S. PATENT DOCUMENTS

2017/0206049 A1* 7/2017 Choi ..................... G06F 1/1618
2017/0357292 A1* 12/2017 Cho ...................... G06F 1/1656

* cited by examiner

*Primary Examiner* — Muhammad N Edun
(74) *Attorney, Agent, or Firm* — ScienBiziP, P.C.

(57) ABSTRACT

A mobile device with display screen of more than one size includes a first portion and a second portion. The first portion includes a main screen and a first gyroscope sensor. The main screen is located on a front surface of the first portion. The second portion includes an auxiliary screen and a second gyroscope sensor. The auxiliary screen is located on a front surface of the second portion. The first and second portions are pivotally connected to each other and can be folded or unfolded. The first and second gyroscope sensors can determine the folded and unfolded states of the first and second portions so as to switch the mobile device into a single screen mode of the main screen or a dual screen mode of the main and auxiliary screens.

20 Claims, 4 Drawing Sheets

MOBILE DEVICE WITH SIZE-ADJUSTABLE SCREEN

CROSS REFERENCE TO RELATED APPLICATION

This application claims priority to Chinese Patent Application No. 201710458849.7, filed Jun. 16, 2017, the disclosure of which is incorporated herein by reference in its entirety.

FIELD

The present disclosure relates to display technology in mobile devices, and more particularly to a mobile device with variable sized screens.

BACKGROUND

A mobile device, such as a smartphone, tablet, etc., has a screen that allows a user to navigate web pages, play games, watch videos or perform other activities. However, conventional mobile devices have a fixed size screen such that the size of the screen cannot be varied according to the user's different activities. For example, it is more convenient to use a small screen mobile device when the user navigates web pages or plays games, and a large screen mobile device provides a better watching experience when the user watches videos. The user needs to purchase both a small screen mobile device and a large screen mobile device if the user wants to achieve the best user experience when performing different activities, which greatly increases the cost to the user and is not convenient to carry.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
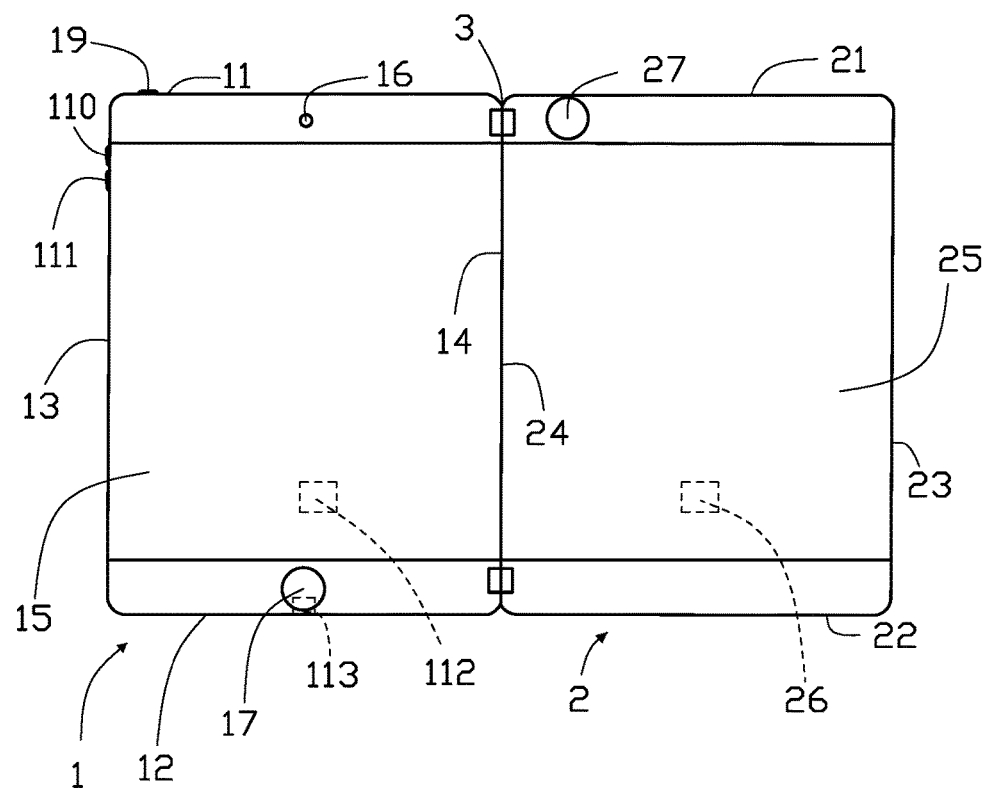
FIG. 1 is a schematic front view of a mobile device of the present disclosure shown in an unfolded position.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" means "including but not limited to"; it specifically indicates open-ended inclusion or membership in the so-described combination, group, series, and the like.

Figure 2:
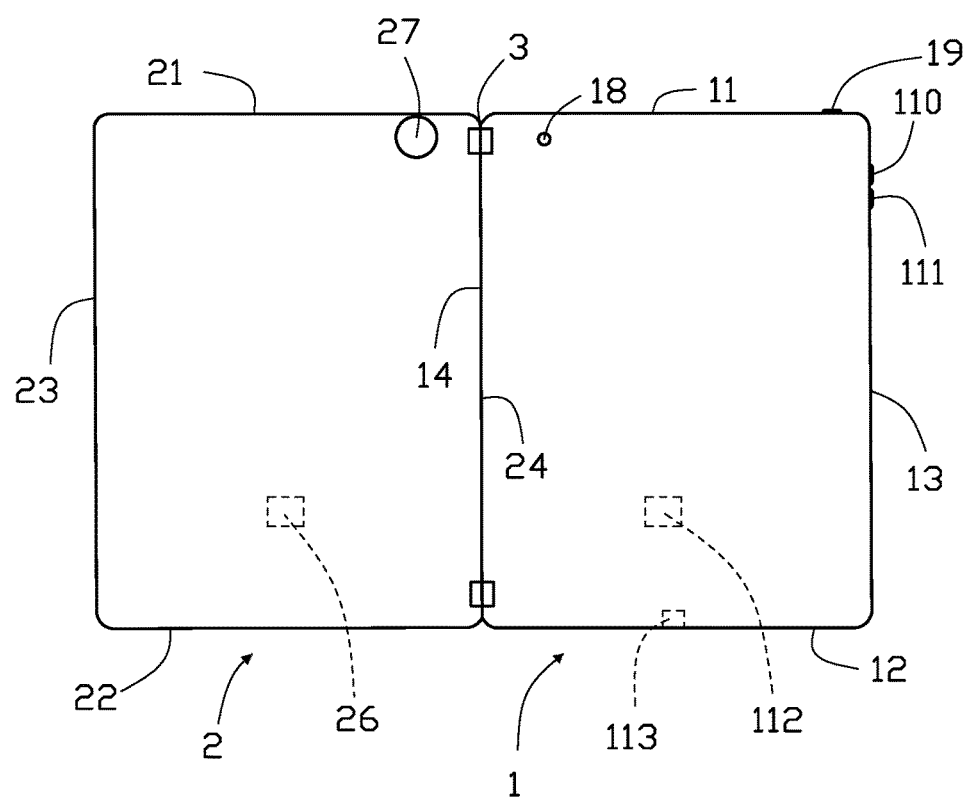
FIG. 2 is a schematic rear view of the mobile device of FIG. 1 shown in an unfolded position.

With reference to FIGS. 1 and 2, an exemplary embodiment of a mobile device includes a first portion 1, a second portion 2, and at least one hinge 3.

The first portion 1 is rectangular, and has a front surface, a rear surface, a top side 11, a bottom side 12, an outer side 13, an inner side 14, a main screen 15, a front camera 16, a home button 17, a rear camera 18, a power button 19, a volume up button 110, a volume down button 111, a first gyroscope sensor 112, and an I/O port 113. The main screen 15 is located in the center of the front surface of the first portion 1. The front camera 16 is located on the front surface of the first portion 1, and is adjacent to the top side 11 of the first portion 1. The home button 17 is located on the front surface of the first portion 1, and is adjacent to the bottom side 12 of the first portion 1. The rear camera 18 is located on the rear surface of the first portion 1, and is adjacent to the top side 11 of the first portion 1. The power button 19 is located on the top side 11 of the first portion 1, and is adjacent to the outer side 13 of the first portion 1. The volume up and down buttons 110, 111 are located on the outer side 13 of the first portion 1. The first gyroscope sensor 112 is mounted in the first portion 1. The I/O port 113 is located on the bottom side 12 of the first portion 1 for recharging and data transmission.

The second portion 2 is rectangular, and has a front surface, a rear surface, a top side 21, a bottom side 22, an outer side 23, an inner side 24, an auxiliary screen 25, a second gyroscope sensor 26, and a hole 27. The auxiliary screen 25 is located in the center of the front surface of the second portion 2. The second gyroscope sensor 26 is mounted in the second portion 2. The hole 27 is formed in the second portion 2.

Figure 3:
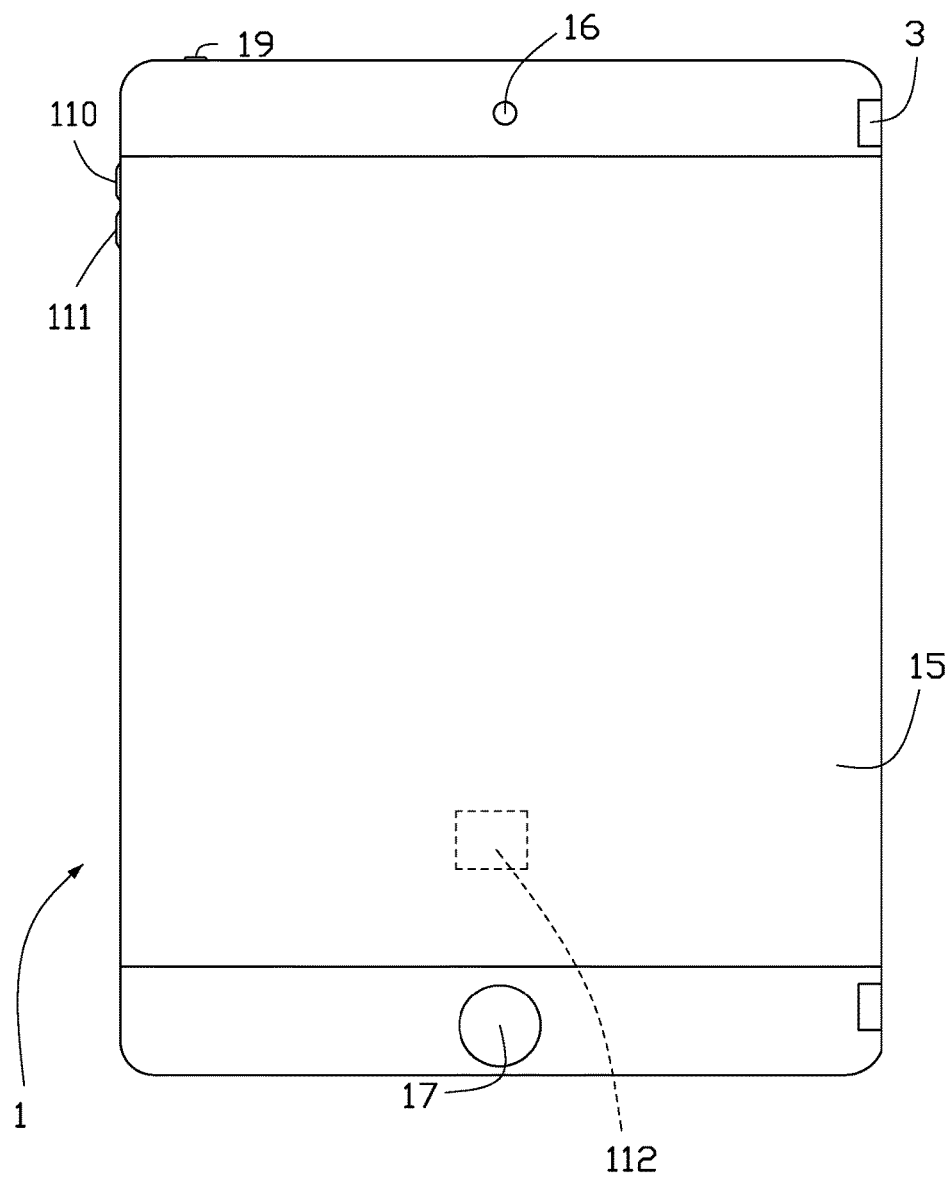
FIG. 3 is a schematic front view of the mobile device of FIG. 1 shown in a folded position.
Figure 4:
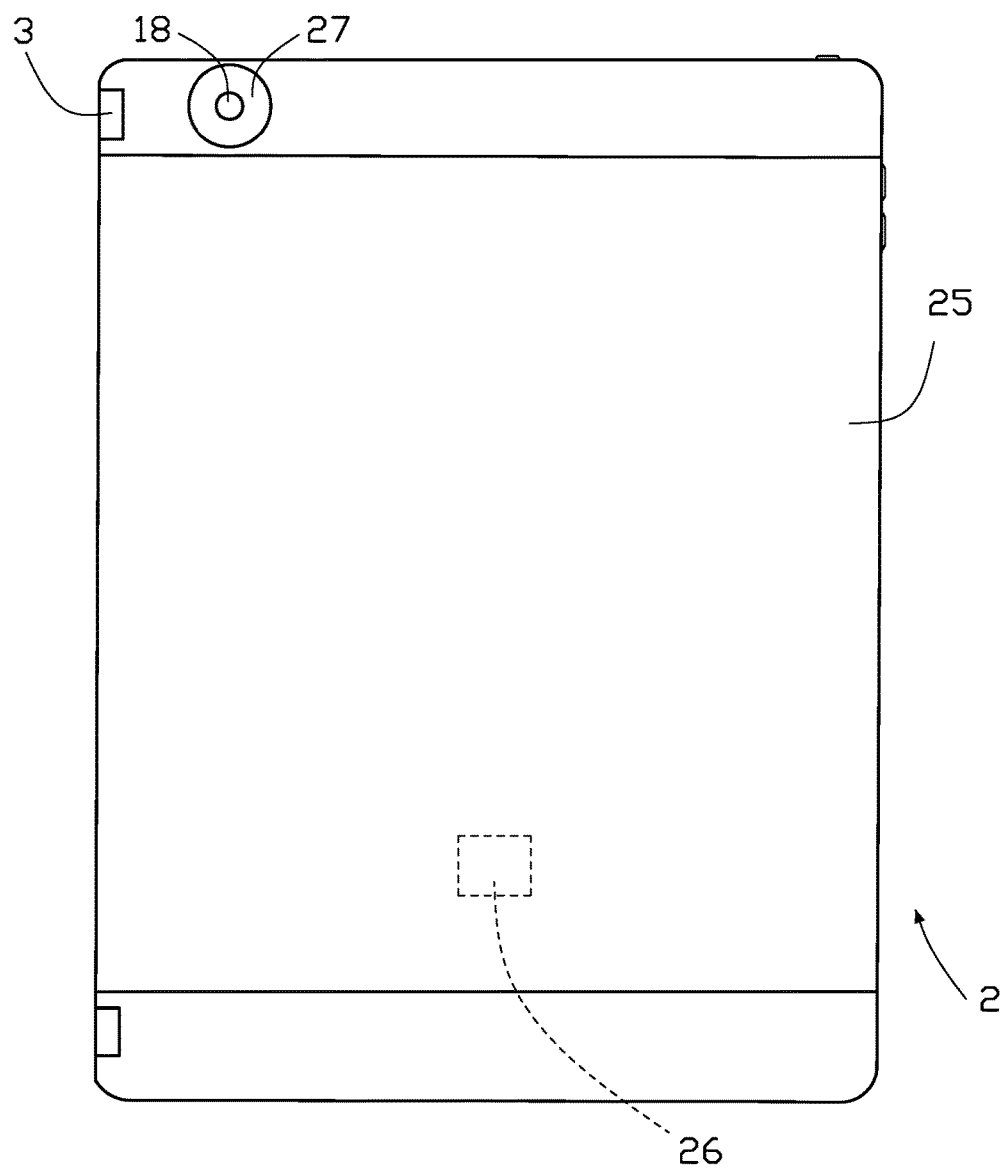
FIG. 4 is a schematic rear view of the mobile device of FIG. 1 shown in a folded position.

The at least one hinge 3 is mounted between the inner sides 14 and 24 of the first and second portions 1 and 2, respectively. In the present exemplary embodiment, two spaced hinges 3 are mounted between the inner sides 14 and 24 of the respective first and second portions 1 and 2, and are respectively adjacent to the top sides 11 and 21 and the bottom sides 12 and 22 of the first and second portions 1 and 2. The first and second portions 1 and 2 are connected by the hinge 3 such that the first and second portions 1 and 2 are pivotally connected to each other and can be folded or unfolded. With reference to FIGS. 3 and 4, the first and second portions 1 and 2 completely overlap, and the rear surface of the first portion 1 faces the rear surface of the second portion 2 when in their folded position. In the folded position, the rear camera 18 of the first portion 1 aligns with the hole 27 of the second portion 2, and is not covered by the second portion 2. With reference to FIGS. 1 and 2, the first and second portions 1 and 2 are arranged side by side and the front surfaces of the first and second portions 1 and 2 are located in the same plane when in their unfolded position. The first and second gyroscope sensors 112 and 26 can determine the folded and unfolded states of the first and second portions 1 and 2 so as to switch the mobile device into a single screen mode of the main screen 15 or a dual screen mode of the main and auxiliary screens 15, 25. The operating principles of the first and second portions 1 and 2 are conventional and thus a detailed description thereof will be omitted.

The first and second portions 1 and 2 are able to pivot relative to each other such that a user can vary the size of the screen according to the needs of the user to achieve the best user experience. For example, the first and second portions 1 and 2 can be folded relative to each other to switch the mobile device into the single screen mode when the user wants to use a small screen mobile device to easily navigate web pages or play games, and the first and second portions 1 and 2 can be unfolded relative to each other to switch the mobile device into the dual screen mode when the user wants to use a large screen mobile device to watch videos to have a better watching experience.

The first and second portions 1 and 2 are able to pivot relative to each other to change an angle therebetween, and the first and second gyroscope sensors 112 and 26 are used to determine a specific angle between the first and second portions 1 and 2 so as to switch the mobile device into a notebook computer mode in which the main screen 15 displays a working window and the auxiliary screen 25 displays a keyboard, or the auxiliary screen 25 displays a working window and the main screen 15 displays a keyboard.

The exemplary embodiments shown and described above are only examples. Many details are often found in the art such as the other features of a mobile device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A mobile device comprising:
    a first portion having:
        a main screen located on a front surface of the first portion;
        a rear camera located on a rear surface of the first portion; and
        a first gyroscope sensor mounted in the first portion; and
    a second portion having:
        an auxiliary screen located on a front surface of the second portion;
        a second gyroscope sensor mounted in the second portion; and
        a hole formed in the second portion;
    wherein the first and second portions are pivotally connected to each other and can be folded or unfolded, the rear camera of the first portion aligns with the hole of the second portion when the first and second portions are folded, and the first and second gyroscope sensors are used to determine that the first and second portions are in a folded or unfolded position so as to switch the mobile device into a single screen mode of the main screen or a dual screen mode of the main and auxiliary screens.

2. The mobile device of claim 1, further comprising at least one hinge mounted between inner sides of the first and second portions;
    wherein the first and second portions are connected by the hinge.

3. The mobile device of claim 2, wherein two spaced hinges are mounted between the inner sides of the first and second portions.

4. The mobile device of claim 3, wherein the first and second portions are pivot relative to each other to change an angle therebetween, the first and second gyroscope sensors are used to determine a specific angle between the first and second portions so as to switch the mobile device into a notebook computer mode in which the main screen displays a working window and the auxiliary screen displays a keyboard, or the auxiliary screen displays a working window and the main screen displays a keyboard.

5. The mobile device of claim 3, wherein the first portion has a power button located on a top side thereof.

6. The mobile device of claim 3, wherein the first portion has a front camera located on the front surface thereof.

7. The mobile device of claim 3, wherein the first portion has a home button located on the front surface thereof.

8. The mobile device of claim 3, wherein the first portion has a volume up button and a volume down button located on an outer side thereof.

9. The mobile device of claim 2, wherein the first and second portions are pivot relative to each other to change an angle therebetween, the first and second gyroscope sensors are used to determine a specific angle between the first and second portions so as to switch the mobile device into a notebook computer mode in which the main screen displays a working window and the auxiliary screen displays a keyboard, or the auxiliary screen displays a working window and the main screen displays a keyboard.

10. The mobile device of claim 2, wherein the first portion has a power button located on a top side thereof.

11. The mobile device of claim 2, wherein the first portion has a front camera located on the front surface thereof.

12. The mobile device of claim 2, wherein the first portion has a home button located on the front surface thereof.

13. The mobile device of claim 2, wherein the first portion has a volume up button and a volume down button located on an outer side thereof.

14. The mobile device of claim 1, wherein the first and second portions are pivot relative to each other to change an angle therebetween, the first and second gyroscope sensors are used to determine a specific angle between the first and second portions so as to switch the mobile device into a notebook computer mode in which the main screen displays a working window and the auxiliary screen displays a keyboard, or the auxiliary screen displays a working window and the main screen displays a keyboard.

15. The mobile device of claim 14, wherein the first portion has a power button located on a top side thereof.

16. The mobile device of claim 14, wherein the first portion has a front camera located on the front surface thereof.

17. The mobile device of claim 1, wherein the first portion has a power button located on a top side thereof.

18. The mobile device of claim 1, wherein the first portion has a front camera located on the front surface thereof.

19. The mobile device of claim 1, wherein the first portion has a home button located on the front surface thereof.

20. The mobile device of claim 1, wherein the first portion has a volume up button and a volume down button located on an outer side thereof.

\* \* \* \* \*